Patented July 27, 1948

2,445,750

UNITED STATES PATENT OFFICE 2,445,750

MILK PRODUCTS AND THE LIKE CONTAINING ALGIN COMPOUND

Victor Charles Emile Le Gloahec, Rockland, Maine, assignor to Algin Corporation of America, New York, N. Y., a corporation of Delaware No Drawing. Original application February 19, 1943, Serial No. 476,488. Divided and this application June 18, 1945, Serial No. 600,230

3 Claims. (Cl. 99—136)

This invention relates to milk products and other aqueous suspensions containing less than 3% concentration of dissolved calcium salt, which products contain as a stabilizer an algin compound. This application is a division of my application, Serial Number 476,488, filed February 19, 1943, for "Algin Compound and Preparation Thereof," now Patent No. 2,400,834 of May 21, 1946. This invention relates especially to the manufacture of a new complex algin compound and to the preparation of milk products and preparations wherein ingredients of milk constitute the principal constituents and occur in a colloidally dispersed state. This invention is particularly useful in the preparation of milk-containing food products such as ice cream, chocolate syrup, milk chocolate, malted milk, and the like.

It is an object of this invention to provide a new complex compound of algin that is soluble in water and that is chemically non-reactive with dissolved calcium salts such as those found in milk products.

For purpose of illustration, this invention will be described in connection with ice cream and the manufacture thereof. Ice cream contains not only all the elements of milk, but also additional albuminous substances and caloric compositions supplied by materials such as eggs, butter fat and assimilable carbohydrate matters in the form of sugar, e. g., a mixture of 70% cane sugar and 30% corn sugar.

In the manufacture of ice cream, it is important to stabilize the protein content of the ice cream both during the manufacture of the ice cream and during storage of the frozen mix. Ice cream mixes are usually pasteurized prior to freezing and the heat of pasteurization tends to decrease the stability of the protein materials in the mixes. There have been several proposals for stabilizing the protein materials in ice cream. Many products have been used for this purpose such as gelatin, Irish moss, carob, gum lecithin in the form of egg yolk. The use of all these materials is attended with disadvantages due to such things as bacteriological contaminations, impairment of flavor or adverse action on texture. None of these materials or the equivalents of those heretofore used has solved in a satisfactory manner the problem of successfully stabilizing ice cream mixes.

It has also been proposed heretofore to incorporate in ice cream mixes the hydrophilous colloid that is recovered from seaweed heretofore chiefly identified in combination with various soluble metallic salts under the general classification of alginates and more accurately to be termed "algin" or "alginous material." Alginous material has remarkable properties as an emulsifying, dispersing and stabilizing agent. Alginous material is advantageous, not only because of its effect in increasing the viscosity of the material with which it is mixed, but also because it has the tendency to maintain particles or granules in suspension adsorbed on or with the alginous micellae. Alginous material also has an emulsifying effect due to the fact that it lowers the superficial tension of the continuous phase of the emulsion.

The characteristics of alginous material above described are especially pronounced when the alginous material is prepared in true colloidal form. The preparation of alginous material of this type is described in Patent Number 2,128,551, which was granted on an application filed by John Robert Herter and myself.

In ice creas mixes, the alginous material is also desirable, in that it greatly improves the smoothness and texture of the ice cream. It also brings out the flavor and aroma of the substances in the ice cream mix and therefore improves the palatability of ice cream.

Notwithstanding the normally desirable attributes of the use of alginous material in milk products such as ice cream, there has been one very serious difficulty incident to the use of pure alginous material for such purposes. When alginous material is included in milk products such as ice cream, the alginous material tends to coagulate and thus lose its valuable properties as a colloidal stabilizing and emulsifying agent.

Milk contains a number of different ingredients, the total solids of milk being in the neighborhood of 12 to 13% by weight. The mineral salt contents of milk contain about 10% by weight of calcium, figured as calcium oxide. Much of this calcium occurs in the milk in the form of calcium combined with protein (including casein) in the form which can be stably dispersed in the milk. Some of the calcium, however, occurs as a water-soluble salt, this salt being for the most part calcium chloride. This water-soluble salt, or at least the bulk thereof, occurs in an ionized condition, the solution of the calcium being dependent primarily upon its existence in an ionized state.

It is the dissolved calcium salt which has an adverse effect upon alginous material when alginous material is added to a milk product such as ice cream, inasmuch as the free calcium of the ionized calcium salt has an affinity for alginous material and tends to effect a coagulation of the alginous material. If alginous material were added to an ice cream mix, for example, and coagulated due to the free calcium, the coagulated alginous material might be filtered off. This however, would serve no useful purpose, as the alginous material would be added simply to be subsequently removed, and is furthermore undesirable in that it would remove from the ice cream some of the calcium, the inclusion of which is very important because of its nutritive value. Calcium is an important food element, being very valuable in connection with the structure of the bones and teeth. It has been estimated that about one gram of calcium is required per day for the maintenance of good health. If, on the other hand, the alginous coagula containing calcium were left in the ice cream, the coagula would detract from the smoothness of the mixture and the coagulated alginous material would have substantially no effect as a stabilizing agent. Moreover, the calcium in the alginous coagula, being in stable combination with the insoluble alginous coagula, would be unassimilable and would not have any substantial nutritive value.

If an ice cream mix is treated with a substance such as tartrate, citrate, or sodium phosphates having the capacity to precipitate the dissolved calcium as an insoluble calcium compound, this method of meeting the problem is also objectionable. If the ice cream mix is filtered, much of the precipitated calcium is removed and its nutritive value lost. The pasteurization of the ice cream promotes the growth of the insoluble particles and the loss of calcium during filtration. Any fine particles of precipitated calcium compound that do pass through the filter are not stable but tend to increase in size and to detract from the smoothness and texture of the ice cream. Moreover, the precipitated calcium is unassimilable. If the ice cream mix is not filtered, the presence, of the unassimilable particles of precipitate is objectionable.

It is the purpose of this invention to overcome the difficulties which have been mentioned hereinabove in the production of milk products such as ice cream which are highly stable and homogeneous.

I have found that an alginate material, on which calcium ions in definite proportions have been fixed, and the still free acid functions of which have been saturated by an alkali in order to obtain a complex, which, in solution has a pH value equal or above 7.0, shows a very weak activity in relation to solutions of calcium salts at weak concentration in the order of 0.3% or less, i. e., within the concentration limit existing in the milk and dairy products in general. This fact would not be remarkable if the algino calcium complex were insoluble before putting it in contact with additional calcium salts in solution. On the contrary, however, the algino-calcium complex is readily soluble in water, but notwithstanding its solubility it does not bring about any coagulation in the presence of the ionized calcium salt which is found in dairy products. In other words, the algino-calcium complex behaves as if it had lost its negative reactive charge which characterizes algin micellae in solution and which one would normally expect to result in coagulation of the compound in the presence of dissolved calcium salt.

I have determined that the proportion of calcium (calculated as pure metal) to be fixed upon the algin molecule must be from 3.1 to 3.5% by weight of the pure algin, which corresponds approximately to one-third of the calcium necessary to obtain a saturation of the acid functions of the algin molecule. If such proportion of calcium is fixed upon the algin by reaction with part of the acid functions of the algin molecule and if the remaining acid functions of the algin molecule are saturated by an alkaline base, a new product is obtained, which is a complex compound that I call alkalino-calco-alginate. This new product enters readily in solution in water, preferably in warm water (a particularly favorable temperature being 150 to 160° Fahrenheit) and has the property of being very inactive chemically in relation to the ionized calcium of soluble calcium salts contained in dairy products or other dilute solutions or suspensions of soluble calcium salts. However, the complex possesses the capacity of maintaining the protein materials in the dairy products or the like in suspension and otherwise acts as a stabilizing and viscosity inducing agent in the same way and to the same extent as pure algin.

The preparation of the alkalino-calco-alginate can be carried out in any of several different ways, provided that the quantity of the calcium to be fixed upon the algin molecule is maintained within the limits specified hereinabove. The process involves the reaction of the algin with a dissolved (ionizable) calcium salt and with an alkaline alkali metal compound. The product can be produced in the form of a solution or in a dry solid form that is soluble merely by adding it to water. Preferably, the reaction is caused to take place so that the calcium becomes fixed to the algin uniformly throughout the alkalino-calco-alginate product. Examples of the preparation of the complex compound alkalino-calco-alginate are as follows:

According to a preferred method for preparing alkalino-calco-alginate, a known quantity of algin is dissolved in water. To this solution there is added an insoluble calcium salt such as calcium phosphate, calcium citrate, calcium tartrate, calcium sulfate, calcium carbonate, etc., the calcium component of the salt being within the range of the proportion of calcium to algin specified hereinabove, and the insoluble calcium salt is suspended uniformly in the solution. At this state, there is no substantial reaction between calcium salt and the algin due to the insolubility of the calcium salt and lack of calcium ions in the aqueous medium. The algin solution containing the suspended insoluble calcium salt is then coagulated by means of an acid, e. g., hydrochloric acid, sulfuric acid, nitric acid, etc., to produce a coagulum wherein the calcium ions are uniformly distributed, the calcium being contained in an ionizable compound. While it is preferable to employ a mineral acid, an organic acid such as acetic acid, formic acid, etc., may be employed, the acid merely serving to lower the pH of the medium until the algin coagulates. If an alkali such as an alkali metal hydroxide, preferably, sodium hydroxide or an equivalent such as sodium carbonate, is added until the pH is raised to 7 or above, the calcium becomes fixed to the algin as soon as the algin has a negative charge imparted thereto as a result of neutralization of the acid functions of the algin by means of the alkali. If the neutralization of the residual acid functions of the algin molecule by the alkali takes place in the presence of an aqueous medium wherein the alkalino-calco-alginate is soluble, the product as formed will be in aqueous solution. If the solution is evaporated to dryness, the complex compound can be produced in dry form.

A preferred method of producing the alkalino-calco-alginate in a dry form consists in taking the algin coagulum containing the suspended calcium salt, separating excess water therefrom, and washing the coagulum with a liquid which is a solvent for water, the liquid being, however, one in which algin and the alkalino-calco-alginate complex compound are insoluble. Alcohols, e. g., ethyl alcohol, isopropyl alcohol, etc., are especially suitable solvents for this purpose. Methyl alcohol is also operative and solvents such as acetone are operable although somewhat less desirable. To the solvent, sufficient alkali is added to saturate the acid functions of the algin molecule and raise the pH of the product to 7 or above. During the washing, the calcium will react with the coagulated algin to form the alkalino-calco-alginate, and this complex compound, while soluble in water, remains insoluble in the alcohol. Upon drying the resulting coagulum of alkalino-calco-alginate complex compound to remove the alcohol, the water-soluble complex compound is produced in a dry solid state.

In the preparation of the alkalino-calco-alginate complex compound according to the example just described, the step wherein the calcium is first added to algin solution while in the form of an insoluble salt is for convenience in obtaining a uniform reaction of the calcium with the algin molecules in the mass. By incorporating the calcium in insoluble salt form, the calcium can be very uniformly distributed throughout the algin before sufficient calcium ions are liberated to cause the reaction between the algin and the calcium to take place, and by thereafter acidifying the mixture to afford the calcium in ionized form and then restoring the negative charge to the algin so that it will react with the ionized calcium, a very uniform reaction between the calcium and the algin takes place, only part of acid functions of the algin molecules being reacted with the calcium uniformly throughout the mass. If a soluble calcium salt such as calcium chloride were to be added directly to a solution of algin, the reaction would occur so rapidly that substantially all of the acid functions of some algin molecules would react with the calcium forming an insoluble calcium compound, leaving other algin molecules substantially unreacted with the calcium. This effect of non-uniform reaction of the algin with the calcium can be counteracted by adding soluble calcium salt to algin solution while the solution is vigorously agitated and by continuing to agitate the solution vigorously for some time, but the method whereby the calcium is initially added in insoluble salt form and after having been uniformly distributed in the algin is converted to soluble and ionizable form, is ordinarily regarded as preferable.

In the process above described for preparing the alkalino-calco-alginate complex compound, enough alkali is eventually present to bring the pH of the complex to 7 or above, thereby satisfying the acid functions of the algin molecule that have not reacted with the calcium. Preferably, the pH of the complex is raised to a pH between 9 and 10 by causing a slight excess of alkali to be present. When the pH of the complex is 9 or above, the rapidity of solution of the complex in water is increased and the inertia of the complex compound toward reaction with ionized calcium in dairy products is increased. A greater excess of alkali is not harmful as far as the action of the complex compound is concerned, but for dairy products and the like it is usually desirable that the dairy product does not contain an undue amount of free alkali; and for this reason it is usually desirable that the pH of the complex be kept below about 10. The foregoing also applies to alkalino-calco-alginate complex compound as prepared by alternative methods such as those described below.

An alternative method for preparing the alkalino-calco-alginate complex compound is to first prepare algin in the form of a coagulum, e. g., by coagulating algin solution by means of a mineral acid, e. g., hydrochloric acid, or sulfuric acid, the calcium salt of which is soluble and then agitate the coagulum with a solution of calcium hydroxide which reacts with the coagulum to the extent of about one-third of the acid functions of the algin molecule. Alcohol to which alkali has been added in an amount to react with the remaining acid functions of the algin molecule is then added to the coagulum and in the alcoholic medium the resulting alkalino-calco-alginate complex compound remains insoluble and can be separated from the excess liquid and dried. If the alcohol is not added, the complex compound is produced in the form of a solution.

Still another method of preparation of the alkalino-calco-alginate complex compound is to distribute in an algin solution calcium carbonate in an amount that affords the required proportion of calcium to algin. To this suspension is added sodium carbonate in an amount that will afford a pH above 7. Under such conditions, the fixation of the calcium on the algin takes place gradually and at the same time the remaining acid functions of the algin are saturated. Alternatively, the calcium carbonate can be suspended in the sodium carbonate solution before the sodium carbonate solution is mixed with the algin solution. According to this example, the mixture of the soda ash with the calcium carbonate serves to render the calcium slightly soluble so that the calcium can occur in an ionized condition, but since the ionization of the calcium is relatively slight, the reaction proceeds slowly and the calcium compound is distributed in the aqueous algin before sufficient calcium ions are liberated to result in substantial reaction between the algin and the calcium. This same comment can be made in connection with the preceding example wherein calcium hydroxide solution and algin coagulum are caused to react. Under such circumstances, the calcium compound is caused to be substantially uniformly distributed in the algin before sufficient calcium ions are liberated to cause the reaction of the algin with the calcium to take place to any substantial extent.

The product that is obtained according to the example just described will be in a paste form or in the form of a solution that can be evaporated to dryness. Alternatively, the reaction product can be thrown down and washed by means of a liquid such as alcohol in which the algin and the alkalino-calco-alginate complex compound are insoluble but in which water is soluble with subsequent separation and drying of the complex compound in coagulum form.

The alkalino-calco-alginate complex compound can also be prepared by mixing eight parts of pure algin (e. g., the pure product prepared according to Patent No. 2,128,551 mentioned hereinabove) with one part of calcium lactate and sufficient alkali to obtain a pH above 7 and preferably, as aforesaid, between 9.0 and 10.0 to provide the complex compound in the form of a solution.

It is apparent from the foregoing that, according to the present invention, I have found that by reacting algin with calcium within the critical range above mentioned to satisfy part of the acid functions of the algin molecule and reacting the balance of the acid functions of the algin molecule with alkali so that the product will have a pH above 7 (and preferably above 9), an alkalino-calco-alginate complex compound is produced which, unlike calcium alginate as heretofore known in the art, has the surprising property of being readily soluble in the water. Moreover, the alkalino-calco-alginate complex compound, while soluble in water, has the surprising property of being chemically inert to ionizable calcium compounds contained in dairy products or other products, solutions or suspensions which contain less than about a .3% solution of ionizable calcium compounds, the new complex compound being unlike other soluble alginous materials in this respect.

Since the alkalino-calco-alginate complex compound has the peculiar properties above mentioned, it can be added to dairy products and the like without coagulation, and is highly effective in desirably modifying such dairy products by increasing their viscosity and by acting as a stabilizing agent in producing exceedingly smooth, stable, and homogeneous colloidal mixtures. In this manner, the difficulties previously encountered in adding algin to dairy products or the like has been overcome and the full effect of the algin as a stabilizing agent is availed of even in the presence of ionized calcium compounds which would ordinarily tend to coagulate algin in its ordinary form.

The specially prepared product, either in powder form or in solution, can be added directly to the dairy products: ice-cream mix, cream, chocolate drink, to obtain stabilization. It brings about true colloidal solutions of a more or less viscous characteristic. These solutions are stable according to the proportions of calcium-alginate complex added. One obtains an excellent stabilization of the ice-cream mix with remarkable smoothness and melting qualities by utilizing $\frac{1}{10}$ of 1% of alginate complex in relation to the ice-cream batch mix.

As hereinabove mentioned, this invention not only is useful in the manufacture of ice cream, but also is useful in connection with other milk products, namely, products containing milk, in which milk ingredients, either by themselves or in combination with other ingredients, preferably occur in a dispersed state such as a colloidal state. Products including cream are to be regarded as milk products as this term is used herein.

According to this invention, the stability of milk products can be greatly increased and, since the calcium in the milk is not removed or rendered unassimilable, the product contains all the nutritive value that it would have in the absence of the incorporation of the materials used according to this invention. In addition, it is to be noted that the materials which are added are of themselves of a nutritive character in assimilable form.

Milk products, such as ice cream, chocolate syrup, milk chocolate, are normally made and sold containing a relatively large amount of water in which the various ingredients are dissolved or suspended. It is apparent, however, that any such product produced according to this invention can be dehydrated, and that in such case the advantages and features of this invention that have been described herein would be realized during the preparation of the product and would be valuable in any preparation produced by adding water to the dried product. Thus dried products can be prepared according to this invention such as malted milk, milk chocolate drinks sold in powdered form, ice cream powder and the like. Moreover, while this invention is of particular utility in connection with products used for food, it is not necessarily limited to food products, inasmuch as this invention is applicable in connection with the stabilization and dispersion of milk ingredients of any milk product or other product containing a low percentage of dissolved calcium salt of the order above mentioned.

While this invention has been described in connection with certain specific illustrations, it is to be understood that this has been done for the purpose of affording an understanding of the practice of this invention and that the practice of this invention, as illustrated by the examples which have been given, can be varied within the scope of this invention as determined by the language of the following claims.

I claim:

1. A milk product containing the complex compound alkalino-calco-alginate by reaction in an aqueous medium of algin with an ionizable calcium salt and with an alkaline alkali metal compound to satisfy the acid functions of the algin molecule partially with calcium and partially with alkali metal, said compound having in aqueous solution a pH of at least 7 and the proportion of calcium (calculated as metal) to algin (calculated as pure algin) in said compound being from 3.1 to 3.5 per cent. by weight of said algin.

2. An aqueous suspension containing soluble calcium salt of less than .3% concentration and containing as a stabilizer the complex compound alkalino-calco-alginate by reaction in an aqueous medium of algin with an ionizable calcium salt and with an alkaline alkali metal compound to satisfy the acid functions of the algin molecule partially with calcium and partially with alkali metal, said compound having in aqueous solution a pH of at least 7 and the proportion of calcium (calculated as metal) to algin (calculated as pure algin) in said compound being from 3.1 to 3.5 per cent. by weight of said algin.

3. An ice-cream mix containing as a stabilizer the complex compound alkalino-calco-alginate by reaction in an aqueous medium of algin with an ionizable calcium salt and with an alkaline alkali metal compound to satisfy the acid functions of the algin molecule partially with calcium and partially with alkali metal, said compound having in aqueous solution a pH of at least 7 and the proportion of calcium (calculated as metal) to algin (calculated as pure algin) in said compound being from 3.1 to 3.5 per cent. by weight of said algin.

VICTOR CHARLES EMILE LE GLOAHEC.

REFERENCES CITED

The following references are of record in the file of this patent:

UNITED STATES PATENTS

| Number | Name | Date |
| --- | --- | --- |
| 1,162,926 | Ingham | Dec. 7, 1915 |
| 1,415,849 | Erdahl | May 9, 1922 |
| 1,710,505 | North | Apr. 23, 1929 |
| 2,036,922 | Clark et al. | Apr. 7, 1936 |
| 2,097,224 | Clark et al. | Oct. 26, 1937 |
| 2,097,229 | Lucas | Oct. 26, 1937 |
| 2,400,834 | Gloahec | May 21, 1946 |